United States Patent
Chen et al.

(10) Patent No.: US 10,248,623 B1
(45) Date of Patent: Apr. 2, 2019

(54) DATA DEDUPLICATION TECHNIQUES

(71) Applicant: EMC IP Holding Company LLC, Hopkinton, MA (US)

(72) Inventors: Xiangping Chen, Sherborn, MA (US); William C. Davenport, Burlington, MA (US); Diane Delgado, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 364 days.

(21) Appl. No.: 14/672,741

(22) Filed: Mar. 30, 2015

(51) Int. Cl.
*G06F 16/2455* (2019.01)

(52) U.S. Cl.
CPC .............. *G06F 16/24556* (2019.01)

(58) Field of Classification Search
CPC ............. G06F 17/30489; G06F 16/24556
USPC ................................................ 707/692
See application file for complete search history.

(56) References Cited

U.S. PATENT DOCUMENTS

| | | | |
|---|---|---|---|
| 6,594,665 B1* | 7/2003 | Sowa | G06F 17/30949 |
| 9,092,151 B1* | 7/2015 | Floyd | G06F 17/30303 |
| 2013/0080389 A1* | 3/2013 | Curley | G06F 17/30088 |
| | | | 707/639 |
| 2015/0039818 A1* | 2/2015 | Yadav | G06F 17/30156 |
| | | | 711/103 |
| 2015/0234710 A1* | 8/2015 | Berrington | G06F 11/1407 |
| | | | 707/664 |

* cited by examiner

*Primary Examiner* — Jensen Hu
(74) *Attorney, Agent, or Firm* — Muirhead and Saturnelli, LLC

(57) ABSTRACT

Described are techniques for processing data. Hash values for the data portions of a logical device are determined. Each data portion has a corresponding one of the hash values. It is determined whether a first of the hash values associated with a first of the data portions is equal to a hash value of an implied data value. If the first hash value is equal to the hash value of the implied data value, first processing is performed including determining whether the first data portion has a current data value equal to the implied data value, and responsive to determining that the first data portion has a current data value equal to the implied data value, performing second processing including updating first metadata for the first data portion to denote that the first data portion has the implied data value. The first data portion is not associated with allocated storage.

13 Claims, 12 Drawing Sheets

DATA DEDUPLICATION TECHNIQUES

BACKGROUND

Technical Field

This application generally relates to data deduplication.

Description of Related Art

Computer systems may include different resources used by one or more host processors.

Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of processing data comprising: receiving a plurality of data portions of a logical device; determining a plurality of hash values for the plurality of data portions, each of the plurality of data portions having a corresponding one of the plurality of hash values; determining whether a first of the plurality of hash values associated with a first of the plurality of data portions is equal to a hash value of an implied data value; and if it is determined that the first hash value is equal to the hash value of the implied data value, performing first processing comprising: determining whether the first data portion has a current data value equal to the implied data value; and responsive to determining that the first data portion has a current data value equal to the implied data value, performing second processing including updating first metadata for the first data portion to denote that the first data portion has said implied data value, wherein the first data portion is not associated with allocated storage mapped to the first data portion. The implied data value may have a zero data value. The plurality of data portions may be logical data blocks of the logical device. The method may be performed as part of data deduplication processing and no data deduplication may be performed for the first data portion and any other ones of the plurality of data portions equal to the implied data value. Data may be written to the plurality of data portions. The first metadata may include a flag field that is updated in the step of updating to denote that the first data portion has said implied data value. The second processing may include any of unmapping and deallocating a storage location associated with the first data portion where the storage location includes data content denoting the implied data value.

In accordance with another aspect of the invention is a system comprising: a processor, and a memory comprising code stored thereon that, when executed, performs a method of processing data comprising: receiving a plurality of data portions of a logical device; determining a plurality of hash values for the plurality of data portions, each of the plurality of data portions having a corresponding one of the plurality of hash values; determining whether a first of the plurality of hash values associated with a first of the plurality of data portions is equal to a hash value of an implied data value; and if it is determined that the first hash value is equal to the hash value of the implied data value, performing first processing comprising: determining whether the first data portion has a current data value equal to the implied data value; and responsive to determining that the first data portion has a current data value equal to the implied data value, performing second processing including updating first metadata for the first data portion to denote that the first data portion has said implied data value, wherein the first data portion is not associated with allocated storage mapped to the first data portion.

In accordance with another aspect of the invention is a computer readable medium comprising code stored thereon that, when executed, performs a method of processing data comprising: receiving a plurality of data portions of a logical device; determining a plurality of hash values for the plurality of data portions, each of the plurality of data portions having a corresponding one of the plurality of hash values; determining whether a first of the plurality of hash values associated with a first of the plurality of data portions is equal to a hash value of an implied data value; and if it is determined that the first hash value is equal to the hash value of the implied data value, performing first processing comprising: determining whether the first data portion has a current data value equal to the implied data value; and responsive to determining that the first data portion has a current data value equal to the implied data value, performing second processing including updating first metadata for the first data portion to denote that the first data portion has said implied data value, wherein the first data portion is not associated with allocated storage mapped to the first data portion. The implied data value may be a zero data value. The plurality of data portions may be logical data blocks of the logical device. The method may be performed as part of data deduplication processing and no data deduplication may be performed for the first data portion and any other ones of the plurality of data portions equal to the implied data value. Data may be written to the plurality of data portions. The first metadata may include a flag field that is updated in updating to denote that the first data portion has said implied data value. The second processing may include any of unmapping and deallocating a storage location associated with the first data portion where the storage location may include data content denoting the implied data value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
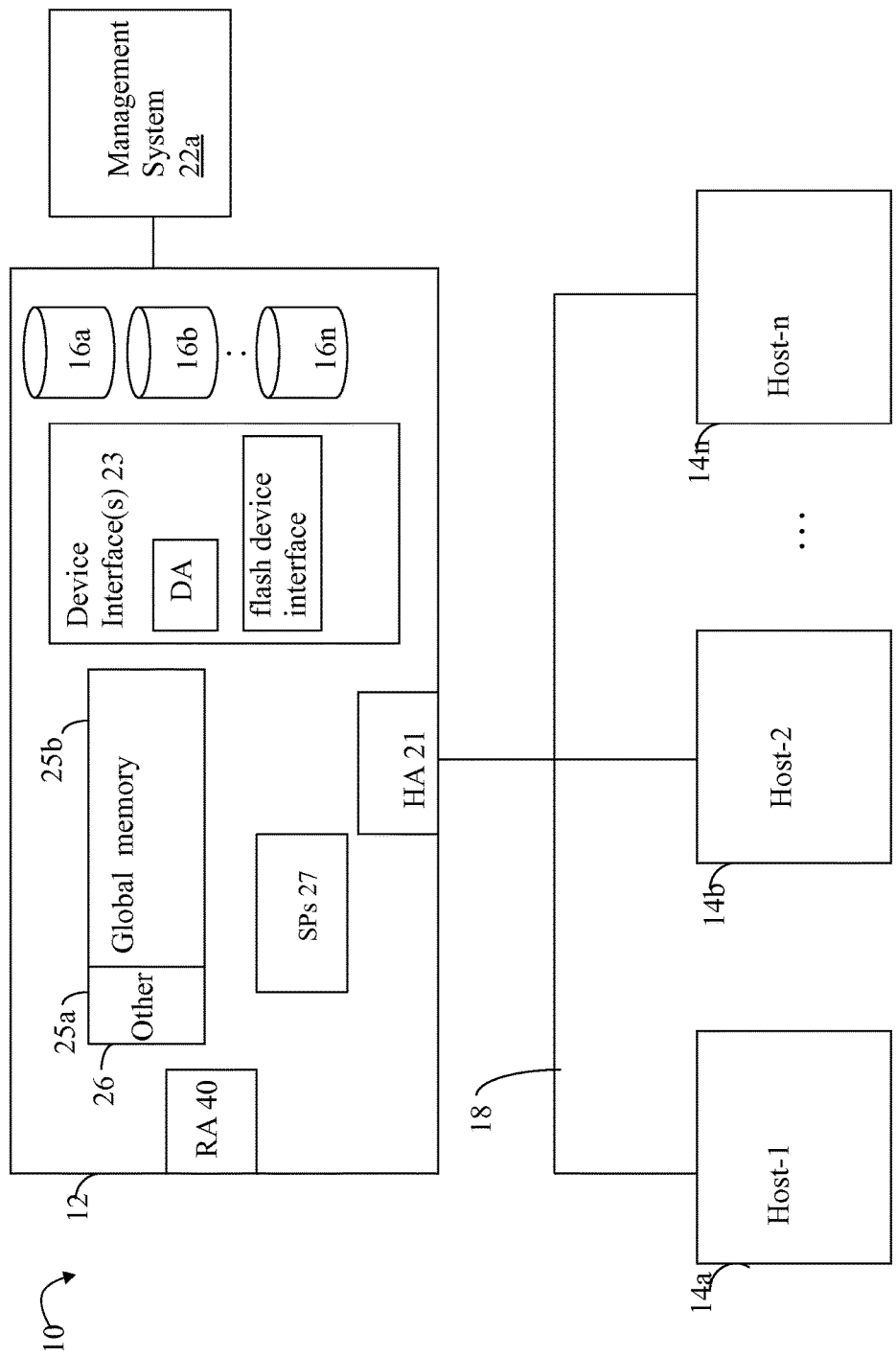
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that techniques herein may be described in examples of embodiments with management of memory, such as may be included in a data storage system. However, those skilled in the art will appreciate that techniques herein may be more generally applied to any suitable resource of any suitable system or component.

In connection with a data storage system, one technique that may be performed is data deduplication (also often referred to as "single instance storage" or SIS). Data deduplication techniques manage duplicate copies of content by keeping a single copy of the content and providing a reference or token to the single copy thereby eliminating redundant data. Only one unique instance of the data is actually retained on physical storage media and redundant data is replaced with a pointer to the unique data copy.

Described in following paragraphs are techniques that may be used in connection with data deduplication to eliminate overhead associated with zero data blocks where each such data block may be included in a data entity stored on the data storage system and each such data block may have a numeric value of zero. More generally, techniques herein may be used in eliminating metadata used by data deduplication to track and maintain all such zero data blocks. Before describing such techniques, general description is provided regarding data deduplication processing as may be performed in an embodiment in accordance with techniques herein. Subsequently, techniques herein are described along with further examples of data structures that may be used in an embodiment in accordance with techniques herein.

A data element, such as a file, an entire logical or physical device, or other data entity, may be partitioned into one or more atomic units. Each such unit may be the same size. A hash value may be computed for each atomic unit of a data set. The hash values may be used in detecting differences or changes between data sets as described in more detail in following paragraphs. The particular block size selected may vary with embodiment. It should be noted that although the techniques described herein utilize hash values, other tokens may be used to uniquely represent a portion of data, such as a data block. Other such tokens may vary with embodiment.

In connection with data deduplication, an embodiment may use a fixed length block size as the atomic unit for detecting changes as may be used in a system. The block size may be, for example, 4 KB, 8 KB, 16 KB, and the like. In such systems, the fixed block size facilitates a sufficient level of compression of the original data sets while also providing a scaleable approach in accordance with storage and CPU resources. The particular fixed block size selected may vary with embodiment and may be determined using, for example, empirical testing or sampling of expected input data streams. An embodiment utilizing the techniques described herein may have a fixed length block size as the unit for partitioning data such as, for example 4 KB, or select from one or more block sizes occurring on defined boundaries such as, for example, 4 KB, 8 KB, or 16 KB.

Figure 2:
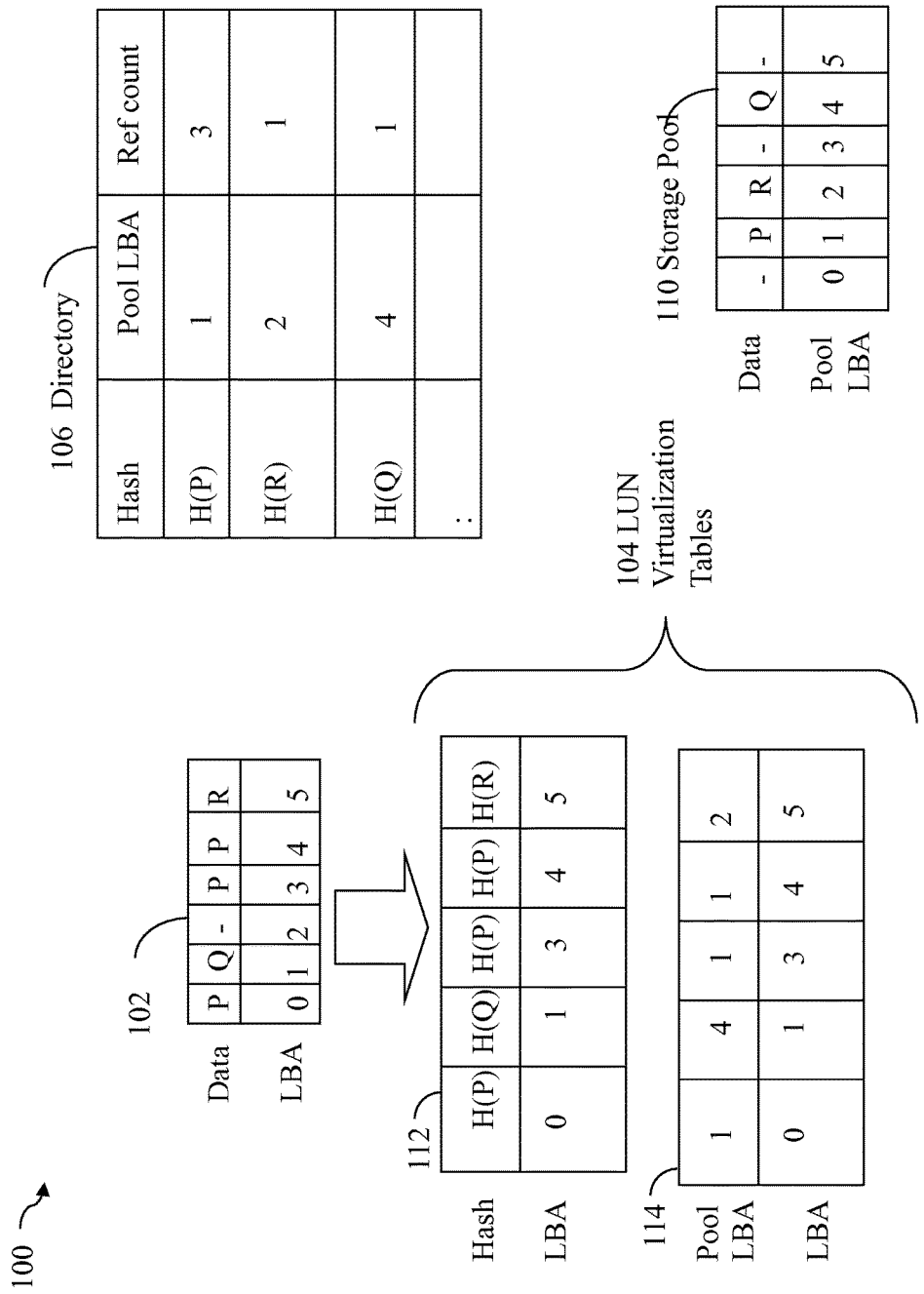
FIG. 2 is an example illustrating a data segment, computed hash values, and data structures that may be used in an embodiment in accordance with techniques herein.

Referring now to FIG. 2, shown is an example representation illustrating data structures that may be used in connection with data deduplication techniques. The example 100 includes a data segment 102, LUN virtualization tables 104, a directory structure 106, and a global pool 110. The LUN virtualization tables 104 include tables 112 and 114. The data segment 102 may be partitioned into various partitions or portions of data as represented by the letters P, Q and R. The data segment 102 may be, for example, data from one or more files, a specified segment of data from a device, and the like. For purposes of illustration, a portion of data which is duplicated in one or more locations in 102 includes the same letter. For example, the data segment 102 includes three data portions which are the same as denoted by the letter P. In connection with the techniques described herein, a token, signature, or reference uniquely representing each of the data portions is obtained. In one embodiment, the token or signature may be a hash value obtained using a hashing function, such as a cryptographic hashing function. Examples that may be used in an embodiment include, for example, the MD-5 and SHA-1 hashing algorithms. The size of the hash value used in connection with the techniques described herein may with embodiment.

A data segment 102 may be represented or virtualized using the one or more hashes corresponding to the portions of the segment 102. In connection with the techniques described herein in one embodiment, a received data segment 102 is partitioned into fixed portions as illustrated by 102. In the example 100, the size of each portion may be 4 KB or the size of one logical block. Each logical device, such as an LUN, may include multiple blocks and a location on the LUN may be represented by a logical block number or address (LBA) corresponding to an offset value which is multiple of the block size for the LUN (e.g, offset=LBA*block size). In this example, the data segment 102 includes 6 LBAs numbered 0 . . . 5, inclusively. A hash value for each of the data portions, such as each of LBA's of 102, may be determined as represented by 112. It should be noted that at LBA 2, there is no data stored and in the representation 112, such unused data portions may be omitted. The representation 112 includes a map of each LBA of data (e.g., P, Q, R) and its corresponding hash value (e.g., denoted H(P), H(Q), and H(R), respectively). The representation 112 is one form of virtualization of the data segment 102.

When a program stores the data segment 102 in a data storage system performing data deduplication, processing may include generating a corresponding list of one or more hash values, such as illustrated by 112. The data storage system may store a single instance of each unique data portion, such as each LBA, and may use a list of the hash values 112 to also refer to a representation of the data segment 102. For example, data deduplication processing may store 3 unique data portions or partitions P, Q and R for the data segment 102.

In connection with storing the actual content or data, the data storage system may allocate storage for the data from a data storage pool comprising one or more data storage devices. When a data segment is received, it may be partitioned and the hash value for each portion determined as described above. Each unique portion (e.g., the actual data or content) may be stored in the storage pool 110 at a location (e.g., pool LBA). The hash value and the pool LBA of the data are recorded along with a reference count in a directory 106. The directory 106 includes an entry for each such unique data portion. The reference count indicates how many times the unique data portion is referenced or occurs in one or more data sets received by the data storage system for storage. For example, the directory 106 illustrates the contents of the directory 106 for the data segment 102. Thus, only three LBAs of data are actually stored to represent the segment 102.

The directory 106 may be indexed by hash value determined for a data portion of a fixed size. In connection with the example 100, H(P) is the first element in the specified hash range of the directory 106, H(R) is the second such element and H(Q) is the third element in the hash range. An embodiment may utilize any one or more different structures to implement the directory 106. Particular examples are described in connection with examples herein.

As will be appreciated by those skilled in the art, it should be noted that a hash collision may occur when two different data portions generate the same hash using a given hash algorithm. However, depending on the hashing algorithm, size of the data portions, and the size of the hash value, the probability of a hash collision may be non-zero but extremely small. Thus, an embodiment may select values and algorithms to facilitate in minimizing hash collisions and appropriately selecting techniques for handling hash collisions as known in the art.

Element 110 represents the storage pool where the data portions are stored. It should be noted that the pool LBA represents an LBA of a LUN used to store the data portions. In an embodiment in which multiple LUNs are used to store the data portions, the pool LBA may be denoted to include the LUN as well as the LBA as may be illustrated in connection with other examples herein.

It should be noted that the element 114 represents another virtualization of the data segment 102 that may be used to uniquely identify each data portion or partition. Rather than use the hash value as the token or reference to the data portions, the pool LBA or location in the storage pool may be used.

When a program stores data at the data storage system, a virtualized representation of the data segment 102, such as illustrated by 112 or 114, may be generated. The virtualized representation may be used to later retrieve the actual data from the data storage system. When presented with the virtualized representation of the data segment, the data storage system may fetch the actual content or data and return the data segment 102. Once a data portion or partition is stored, the data remains at the location in the storage pool while the reference count is non-zero. When the reference count is zero, it means that the data partition is no longer referenced in any data stored in a data storage system and may be deleted.

A virtualized representation of data segments, such as a files, may be used to determine differences between data segments, writing subsequent data segments, retrieving data for previously stored data segments, and the like.

Figure 3:
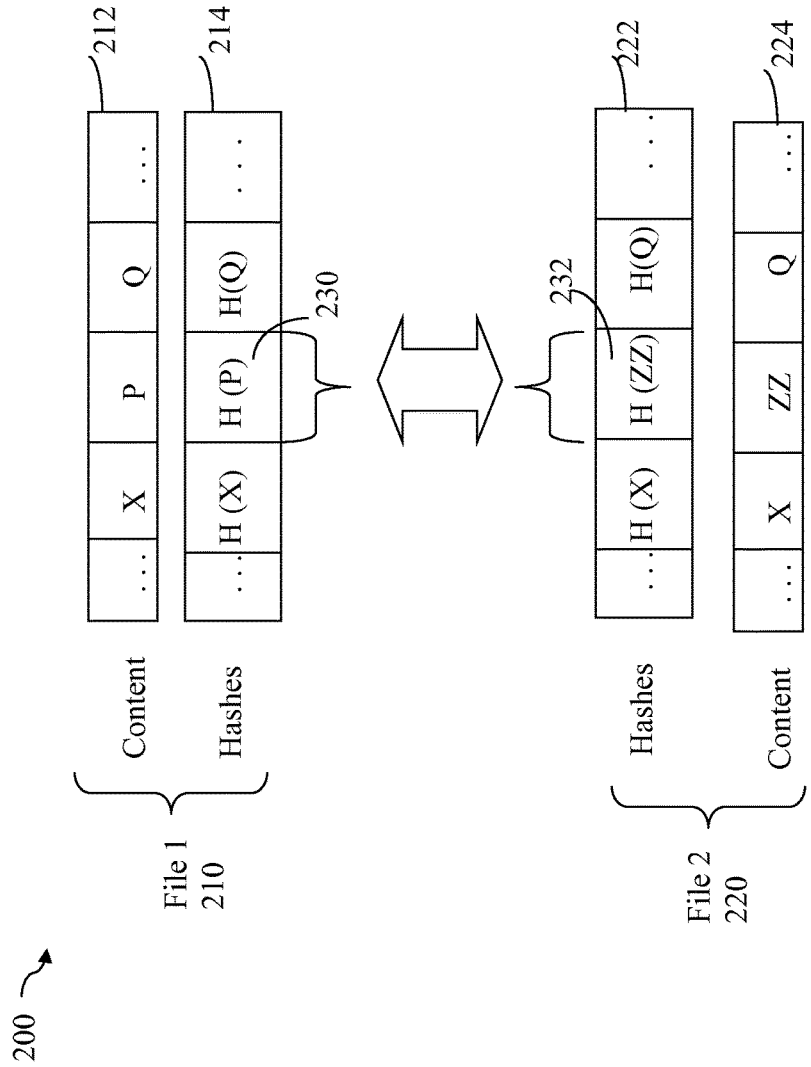
FIG. 3 is an example illustrating data content and computed hash values for different files that may be used in an embodiment in accordance with techniques herein.

Referring to FIG. 3, shown is an example illustrating a virtualized representation and comparison of two files. A first file 210 may have content 212 and may be represented using the virtualized representation 214. A second file 220 may have content 224 and may be represented using the virtualized representation 222. The virtualized representations 222 and 214 may be generated, for example, by the data storage system in response to requests to store files 210 and 220. The virtual representations 214 and 222 may be compared to determine which portions of the two files 210 and 220 are different. With reference to FIG. 3, the portions 230 of file 210 and 232 of file 2 differ. File 210 may be a file at a first point in time and file 220 may be a different version of the same file at a subsequent point in time. For example, a first backup data set may include file 210. At a later point in time, a second backup data set including file 212 may also be stored. With data deduplication, storage allocated for use with storing file 210 and 212 may be reduced. The data portions of file 210 may be stored when the first backup set is stored. When the second data set is stored, only the additional new data portion 232 is stored.

A comparison can be made of the hash values for the data portions of file 212 to those hash values in the directory structure to determine if there is a need to store any data portions. If the hash values are already in the directory structure 106, then there is no need to store the data portion. The lookup and comparison of hash values is efficient. If the data portion already has an existing entry in the directory, the reference count is accordingly incremented rather than writing out the data portion which is already included in the storage pool. When storing the file, the data contents may be stored in the storage pool in portions and the virtualized representation may be stored to represent the file.

In an embodiment in accordance with techniques herein and consistent with the foregoing description, block-level deduplication includes scanning ranges of data blocks on one or more data storage devices, finding blocks that contain identical data (duplicates), and replacing duplicates with references to a single data block that is persistently stored. In a highly de-duplicated case, a single data block instance may represent thousands of data blocks each with one reference to the same data block stored on a data storage device. One such example is the process of de-duplicating LUNs including many zero data blocks.

Figure 4A:
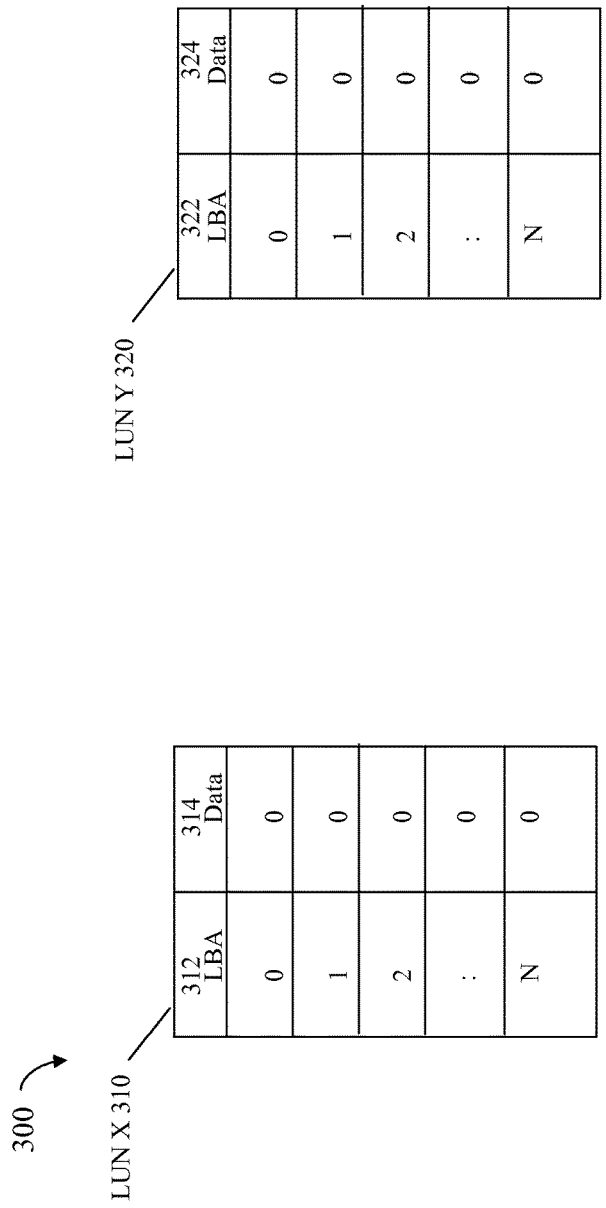
FIG. 4A is an example illustrating data values that may be written to LUNs.

For example, reference is made to FIG. 4A where the example 300 illustrates two LUNs each which may include all zero data blocks. In the example 300, the table 310 illustrates zero data blocks that may be stored at each of the N LBAs of LUN X. Table 310 includes an LBA column 312 and data column 314 where the data column 314 indicates that each LBA includes a block of zeroes. Similarly, table 320 illustrates zero data blocks that may be stored at each of the N LBAs of LUN Y. Table 320 includes an LBA column 322 and data column 324 where the data column 324 indicates that each LBA includes a block of zeroes. Tables 310 and 320 may represent information that may be stored in one or more data structures using metadata and data blocks.

In a system performing data deduplication as described herein, rather than store 2N zero data blocks, a single copy of the zero data block may be stored and each such reference to the single zero data block may be replaced with a reference or pointer to the actual zero data block. In one embodiment, a virtual block mapping (VBM) structure may be utilized as an intermediate structure linking a reference to a data block at a particular LBA to the actual data block including the data, such as the block of zeroes.

Figure 4B:
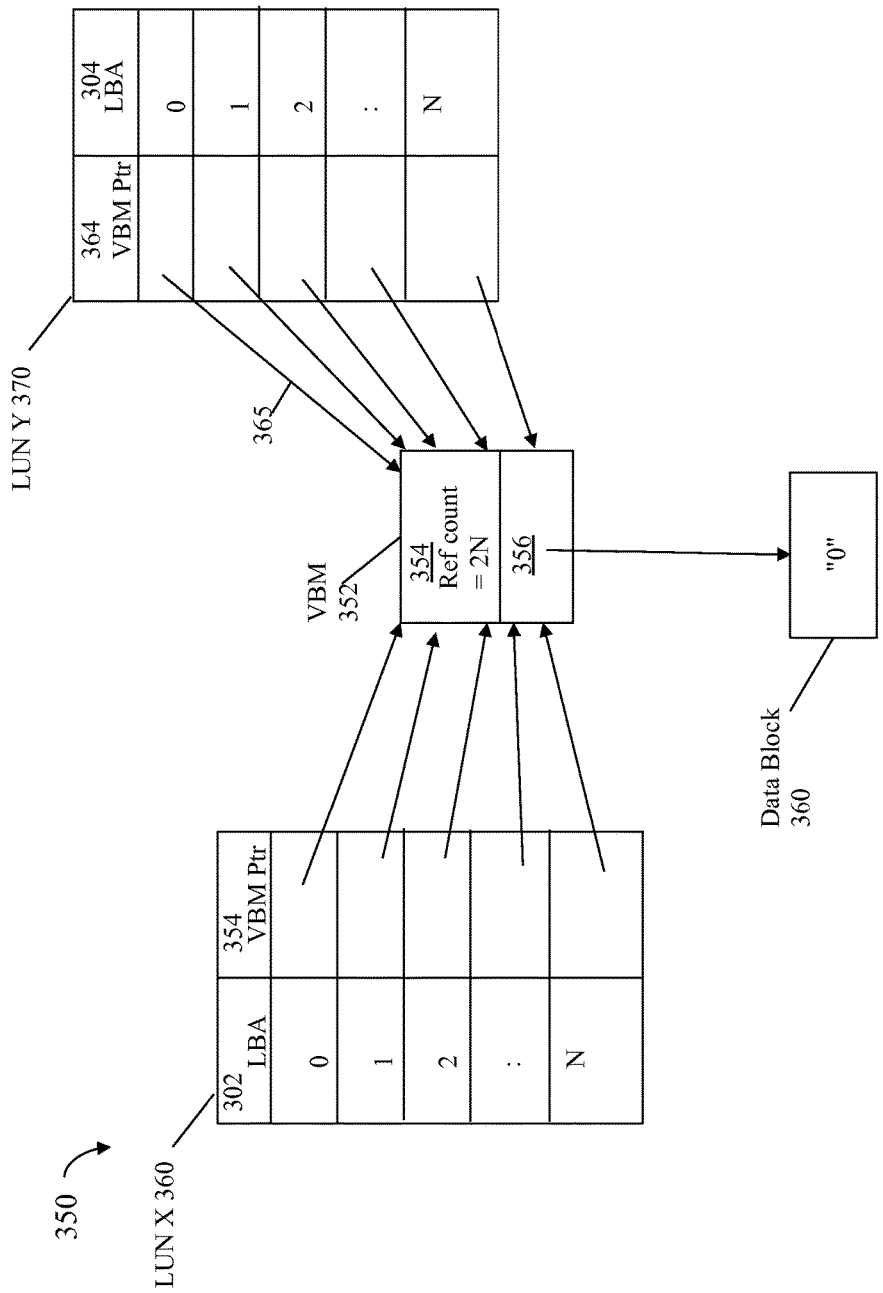
FIG. 4B is an example illustrating a result of data deduplication processing in an embodiment not using techniques herein.

To further illustrate in an embodiment not using techniques herein, reference is made to FIG. 4B to illustrate a state of the system after data deduplication processing is performed. In the example 350, VBM 352 may be a data structure functioning as an intermediate structure linking a data block 360 to each reference to the data block, such as each LBA reference to the data block 360. In this example, data block 360 is illustrated as the zero data block including all zeroes. VBM 352 may include a reference (ref) count field 354 and a pointer 356 to the data block 360. The reference count field 354 may indicate the number of references to the single data block 360. Generally, VBM 352 may include other information than as illustrated in FIG. 4B for simplicity.

It should be noted that in at least one embodiment, the reference count field of the VBM may more generally be characterized as a weighted value denoting whether the associated data block is shared or referenced by multiple LBAs such as a result of data deduplication processing. Further, in a manner similar to the reference count, the larger the number of shared references, the larger the value of the weight. In at least one embodiment, for example, the reference count may have a value of 0 rather than 1 if the associated data block is not shared or referenced by multiple LBAs.

Table 360 illustrates information that may be maintained for LUN X and table 370 illustrates information that may be maintained for LUN Y. Table 360 includes an LBA column 302 and VBM pointer (ptr) column 354 where the VBM column 354 includes pointers or references to the VBM 352 thereby indicating that each LBA of LUN X includes a data block of zeroes. Similarly, table 370 includes an LBA column 304 and VBM pointer (ptr) column 364 where the VBM column 364 includes pointers or references to the VBM 352 thereby indicating that each LBA of LUN X includes a data block of zeroes. It should be noted that the VBM pointers of 354 and 364 may denote a portion of metadata that may be stored for a LUN and for each LBA thereof.

Figure 4C:
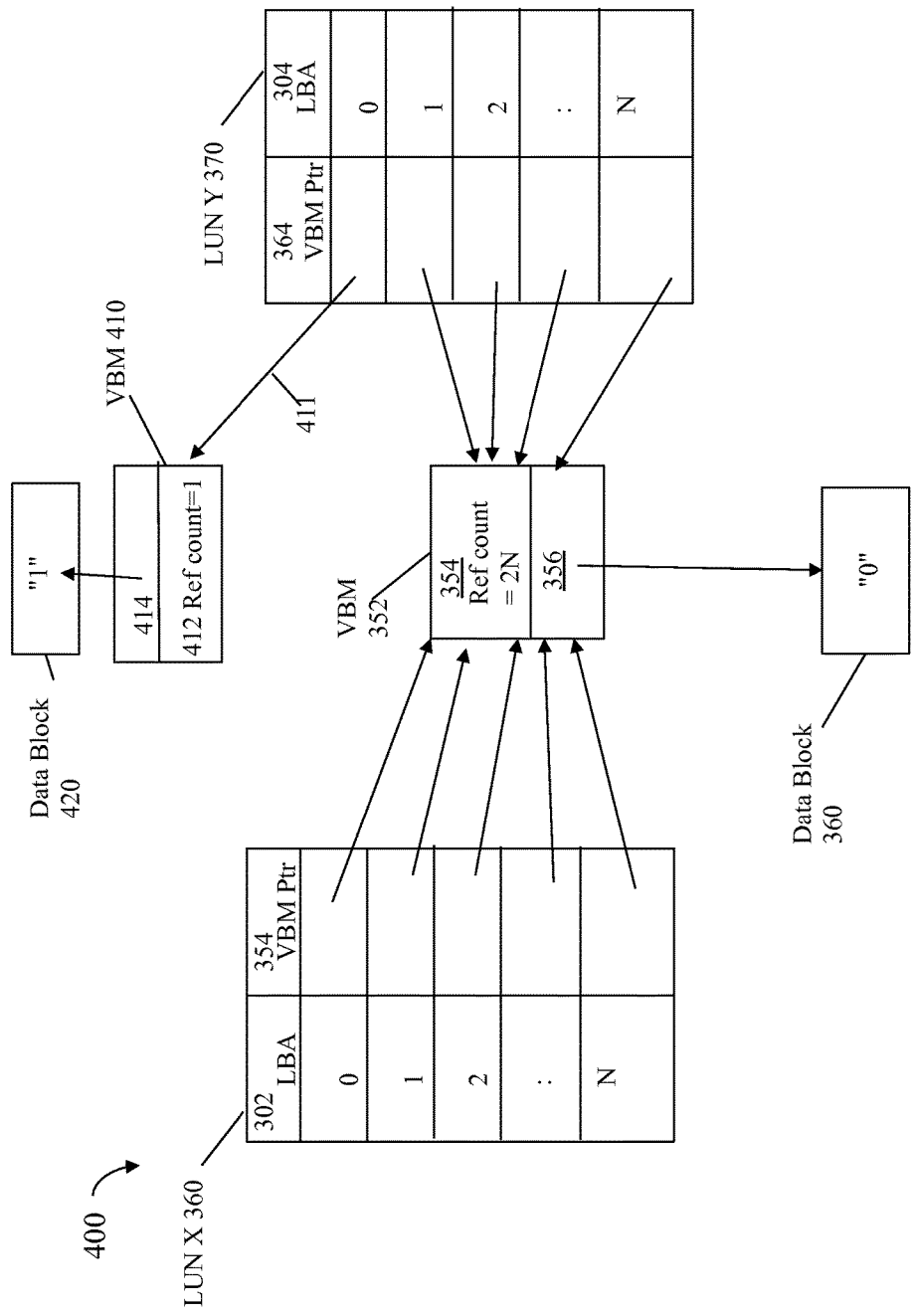
FIG. 4C is an example illustrating a state of a system after performing a write operation.

As can be seen from the example 350 where there are many references to the zero data block 360, a mapping layer of the data storage system including code for creating and maintaining the VBM 352, VBM pointers for each LBA in column 354 to 352, VBM pointers from each LBA in column 364 to 352, and the like, may maintain thousands of references or shared links (comprising the various foregoing pointers) to the single zero data block 360. Such references or pointers utilize memory and impose additional overhead when performing various operations such as, for example, a write split operation, copy operation, delete operation, and the like. For example, if a subsequent operation performs a write of the data value "1" to LBA 0 of LUN Y, processing includes breaking link 365, and, with reference to FIG. 4C, allocating a new second data block 420 to store the data value "1", allocating a new second VBM 410, and creating a new link or reference pointer 411 to link LBA 0 of LUN Y to VBM 410.

Described in following paragraphs are techniques that may be used in an embodiment in accordance with techniques herein with data deduplication processing to eliminate additional overhead such as described above in connection with zero data blocks. Such techniques provide for detecting all such zero data blocks during deduplication processing, and perform alternative processing which alternatively implies a zero value data block and may treat the LBA as an unallocated request by not allocating and not associating any data block with the LBA.

Figure 5:
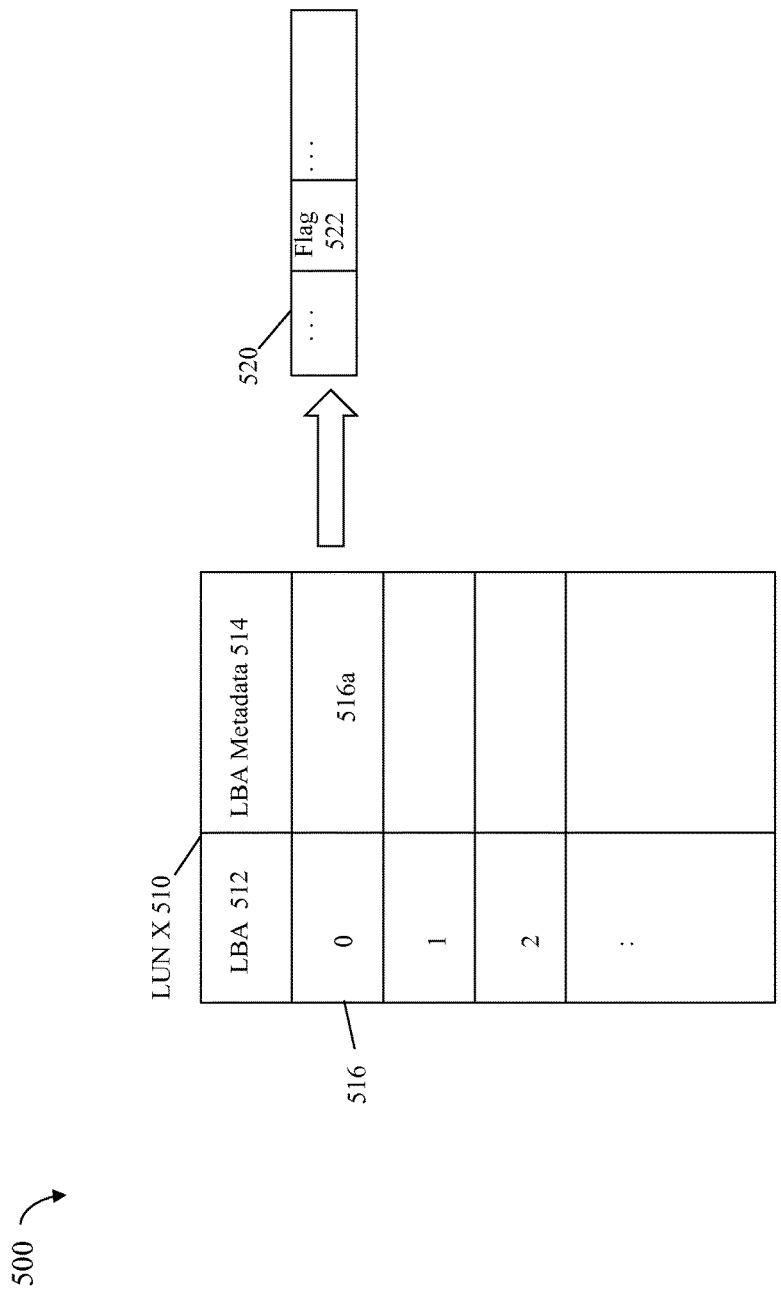
FIGS. 5, 6, 7, 7B and 8 are examples illustrating structures that may be used in an embodiment in accordance with techniques herein.

Referring to FIG. 5, shown is an example 500 of information that may be maintained for a LUN and LBAs thereof in an embodiment in accordance with techniques herein. The table 510 may include information, more generally referred to as metadata, for each LBA of the LUN X as described herein. Table 510 includes an LBA column 512 and LBA metadata column 514. For a given row for an LBA denoted in column 512, column 514 of the same row denotes the metadata for that particular LBA. For example, row 516 indicates that entry 516a in column 514 includes the metadata for LBA 0 of LUN X. The metadata 516a for an LBA such as LBA 0 may include information such as the VBM pointer or address to the VBM structure such as illustrated in FIGS. 4B and C and described above if such an LBA is associated with a data block that is shared or referenced by multiple LBAs such as a result of data deduplication processing. However, if the LBA has an associated data value of 0 (e.g., where the entire data block includes zeroes), the LBA's metadata may alternatively include a special value or indicator denoting that the LBA is an all zero data block. In one embodiment, no actual data block storage filled with zeros may be allocated for use with the LBA and the LBA may not be associated with any allocated storage for a data block.

Element 520 illustrates in more detail what may be included in the metadata 516a for an LBA such as LBA 0 in an embodiment in accordance with techniques herein. In this example, LBA 0 may have a data value of zero (e.g., a data block of all zeroes). Element 520 may include flag field 522 having the special value or indicator denoting that the LBA is a zero data block. Flag field 522 may comprise any suitable number of one or more bits where some combination of the one or more bits when set denotes the special value or indicator denoting that the associated LBA is a zero data block. For purposes of illustration, assume that flag field 522 is a single bit having a value=1 when the associated LBA is a zero data block, and having a value of 0 otherwise. If LBA 0 of LUN X is a zero data block, then the flag field 522 of the associated LBA metadata 516a is set to 1 and denotes that there is no storage or data block allocated for LBA 0 and, additionally, that the LBA) includes an implied data block value of all zeroes. More generally, setting the flag field 522 to the special value or indicator to denote the zero data block indicates that there is no associated data block (no actual storage allocated for storing data of the LBA) and the LBA) includes an implied data content.

In such an embodiment, data deduplication processing may determine which LBAs are all zero data blocks and, rather than performing normal deduplication processing resulting in mappings and associations with an allocated zero data block 360 such as illustrated in FIG. 4B, processing may result in updating table 510 so that the metadata for each LBA that is a zero data block includes the special value or indicator in flag field 522 denoting the zero data block for the associated LBA. For example, if each/all LBAs of LUN X are zero data blocks, then each LBA metadata in column 514 has its corresponding flag field 522 updated to include the special value or indicator to denote that the associated LBA is a zero data block without actually associating the LBA with any allocated data block.

Subsequently, assume there is now an operation or request to read the data contents of LBA 0 of LUN X. Such read processing may be further improved using techniques herein since there is no need to traverse pointers and access an actual data block. In an embodiment in accordance with techniques herein, read processing may retrieve the metadata for LUN X, LBA 0 and examine the metadata 516a to determine whether the flag field 522 of metadata 516a includes the special value or indicator denoting the zero data block. If so, then read processing may return contents or data value for LUN X, LBA 0 as the zero data block whereby such zero data block may be characterized as an implied data value or data contents based on the special value or indicator in the flag field 522. Such data value for LUN X, LBA 0 may be implied based on the flag field 522 and determined without any further processing (e.g., without accessing any data block).

Figure 6:
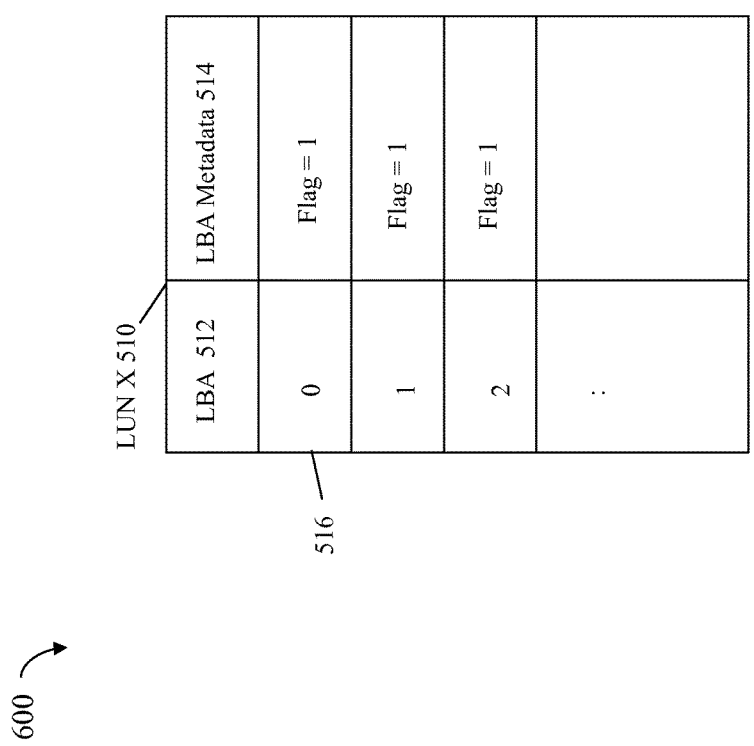
Figure 7:
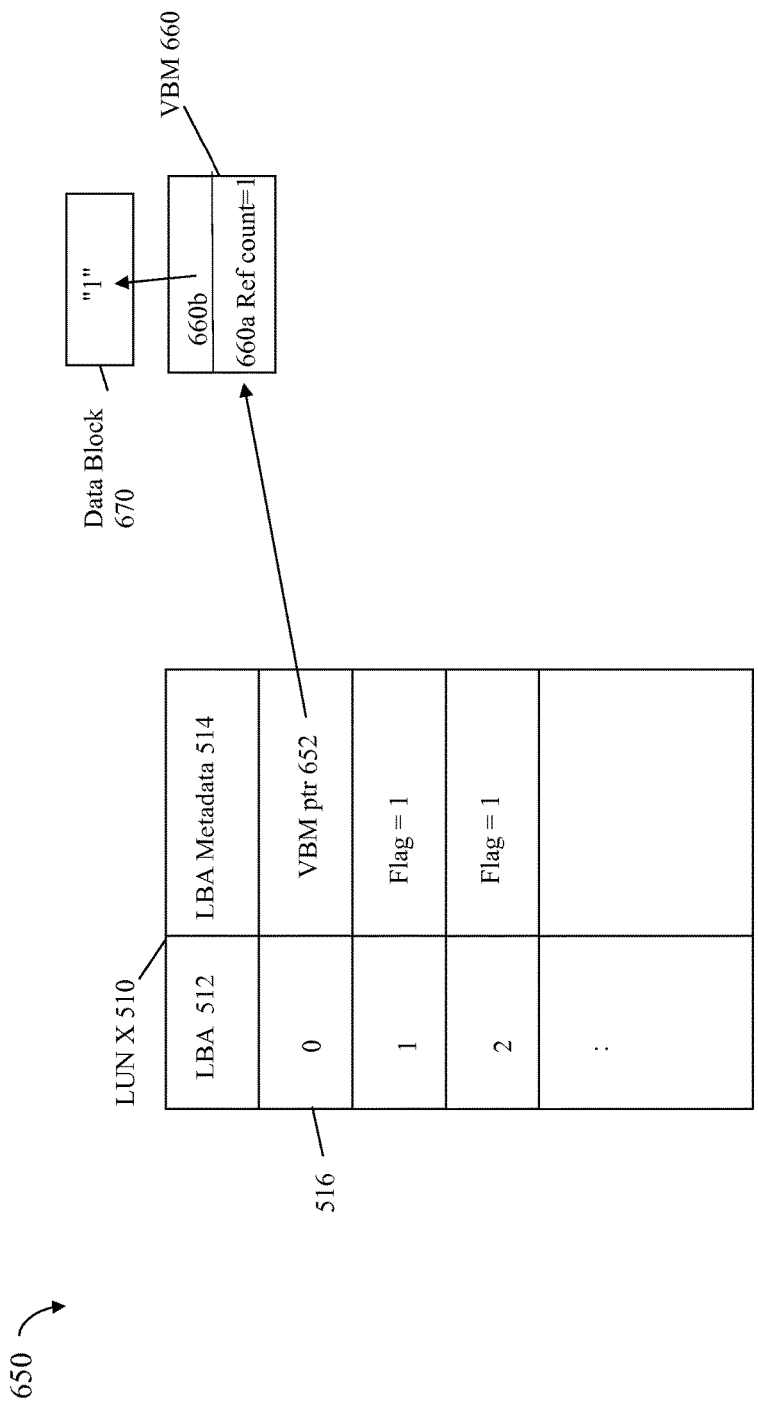

Referring to FIG. 6, shown is an example 600 of the table 510 where each LUN's metadata is updated as a result of data deduplication processing at a first point in time to indicate that each LBA of LUN X is a zero data block. As illustrated in the example 600, each LBA's metadata in column 514 may be accordingly updated to denote that the flag field of the metadata is set to the special value or indicator. In this example, as described above, the flag field may be a single bit having a value of 1 if the associated LBA is a zero data block and a value of 0 otherwise. At a second point in time, a write may be performed to LUN X, LBA 0. With reference to FIG. 7, processing performed for the write operation may result in updating the metadata for LUN X, LBA 0 as reflected in FIG. 7. The write operation may write "1" to LUN X, LBA 0. Processing of the write operation may include allocating storage for the data value 1 in data block 670, allocating storage for the VBM 660, associating VBM 660 with LUN X, LBA 0 using VBM ptr 652, and associating VBM 660 with the data block 670. Processing may also include updating other fields, such as the reference (ref) count field 660a of VBM 660 to 1. It should be noted that the address or pointer to VBM 660 as denoted by VBM ptr 652 may be included in a portion of the LBA metadata for LBA 0.

Figure 7B:
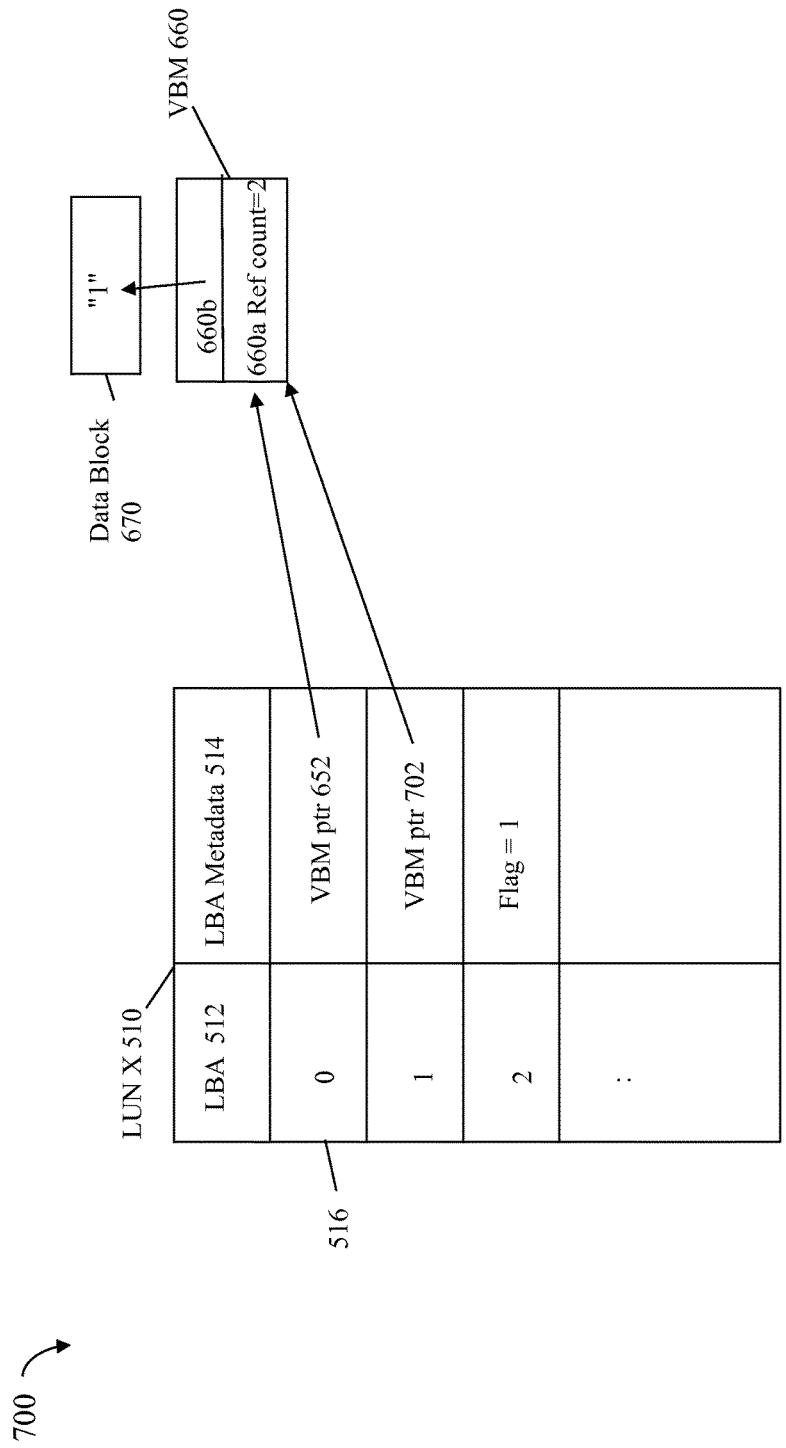

At a third point in time, a second write may be performed to LUN X, LBA 1. With reference to FIG. 7B, processing performed for the second write operation may result in updating the metadata for LUN X, LBA 1 as reflected in FIG. 7B. The second write operation may write "1" to LUN X, LBA 1. Processing of the second write operation may include associating VBM 660 with LUN X, LBA 1 using VBM ptr 702. Processing may also include updating other fields, such as the reference (ref) count field 660a of VBM 660 to 2. It should be noted that the address or pointer to VBM 660 as denoted by VBM ptr 702 may be included in a portion of the LBA metadata for LBA 1 similar to 652 as described above. The state of the system at the third point in time after performing the write may be as a result of performing data deduplication processing that detects that the second write is a duplicate of the first write where both write operations write a data value of "1" to a data block. In this manner, subsequent operations, such as writes and reads, may further modify and/or utilize LBA metadata for such operations as in connection with normal data deduplication processing without the additional overhead as may be incurred in an embodiment without using techniques herein.

The implied value for the LBA data content in this example is a data block of all zeroes. More generally, the techniques herein may be used in connection with any implied data value for user data stored in a data block or other storage unit. For example, at least one embodiment may use an implied user data value for a zero data block since this may be a common user data value for LUN LBAs. However, a different user data value or pattern may also be implied that may also be a common user data value to avoid the additional overhead processing as illustrated herein associated with the zero data block. For example, a second user data value may be a common data value such as used with a particular database or other application (e.g., may denote initialized database records with a particular bit pattern). In such a case, the second user data value may be implied using techniques herein for LBAs or other partitioned storage portions without actually associating logical addresses for such portions with an allocated data block.

In one embodiment, one or more data values may be specified as the special data values such as the zero data block. Each such special data value may denote a different user data value or content that should be treated by data deduplication processing in a manner similar to the zero data block in accordance with techniques herein. In one embodiment, the one or more special data values may be specified in any suitable manner such as, for example, by providing such one or more special data values via user inputs, in a configuration or other data, and the like. In an embodiment allowing multiple special data values, the flag field 522 of the LBA metadata needs to include a suitable number of bits that allow specifying or encoding the particular one of the special data values for an LBA. For example, an embodiment may allow for 3 special data values to be specified. In this case, the flag field 522 should include a sufficient number of bits (e.g., at least 2) that allow for identifying one of the following per LBA:

1. a first of the 3 special data values is implied.
2. a second of the 3 special data values is implied.
3. a third of the 3 special data values is implied
4. no special data value is implied.

Figure 8:
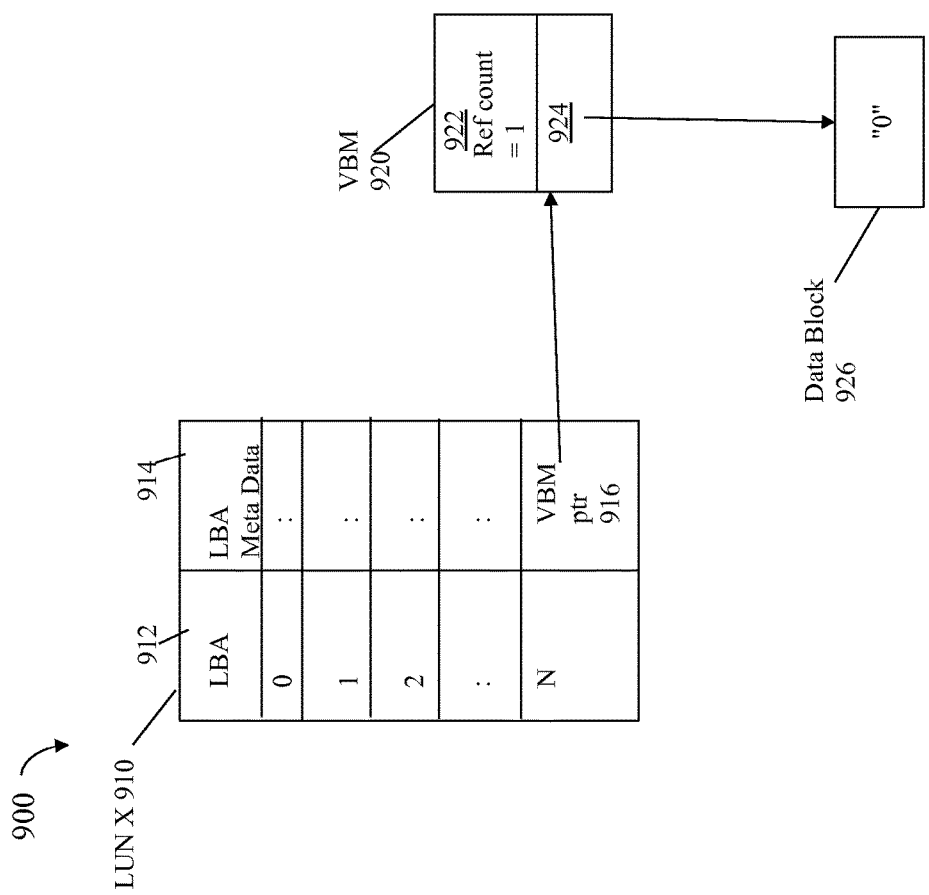

One embodiment in accordance with techniques herein may perform two phase deduplication processing. It is assumed in this embodiment that the data is written to the LUN and then data deduplication processing may be subsequently performed in accordance with techniques herein. For example, the data may be written to a LUN X such as represented in FIG. 4A where storage may be allocated for storing each data block, such as in a manner as illustrated herein in the example 900 of FIG. 8. In FIG. 8, shown is a table 910 of information that may be stored for LUN X in an embodiment in accordance with techniques herein. The table 910 may include a column 912 denoting LBAs and associated LBA metadata 914 as described elsewhere herein. At this point in time, the data blocks of the LUN have not yet been processed to update the flag fields of the LBA metadata of 914. Rather, at this point in time, storage in the form of data blocks may have been allocated to store the data contents for each of the LBAs without any data deduplication. For example, LBA N has associated LBA metadata which includes an address or pointer 916 to VBM 920 which then points to the allocated data block 926 including the zero data block for LBA N of LUN X. In a similar manner, LBA metadata 514 of table 910 for each LBA 0 through N−1, inclusively, may include a VBM pointer to a VBM structure which then further points to an allocated data block including the data for the associated LBA.

After such data has been written, then data deduplication processing in accordance with techniques herein may be performed. In a first data deduplication processing phase, phase 1, processing may be performed to build a hash database or directory of hash values for all data blocks. The phase 1 processing may include determining the hash values for each data block (e.g., LBA). However, duplicate or identical data content and thus the total reference counts for duplicated data contents have not yet been determined. As a result of phase 1, the hash values for each data block have been determined such as represented in FIG. 3.

Once processing has generated the hash values for all data blocks, processing may be performed to look for data blocks having the same hash values. As described herein, it may be possible for two different data values to generate the same hash value. Thus, determining matching or identical hash values may be a first step in determining whether two data blocks include the same or duplicate data content. The two data blocks having the same hash value may also be referred to as data deduplication candidates.

If two data blocks have the same hash value, a second step may be performed in a second data deduplication processing phase to compare the actual data contents (e.g., bit for bit data comparison of the contents) of the two data blocks that are data deduplication candidates. If the two data blocks having the same hash values also have matching or duplicate contents, then data deduplication processing may be performed such as described in connection with FIG. 7B to only store a single instance of the data contents with multiple references or pointers to the single copy of the data content (e.g., one reference or pointer to the data content for each reference in the LUN data).

In an embodiment in accordance with techniques herein, such data deduplication processing to only store a single copy of the data may be performed for data content that is not one of the special data user data values, such as the zero data block. Thus, prior to performing such data deduplication, additional processing may be performed in an embodiment in accordance with techniques herein. For example, consider the case where the zero data block is specified as the special data value for which no storage should be allocated and for which an implied value is determined for LBAs whereby the associated metadata for the LBA has the flag field 522 set to indicate the implied zero data block value. Thus, an embodiment in accordance with techniques herein may detect when the hash value of a data block matches the hash value or signature of the zero data block. Responsive to detecting such a hash value or signature of the zero data block during data deduplication processing, an embodiment in accordance with techniques herein may then examine the actual contents of the data block to determine whether it is actually a zero data block. In one embodiment, a buffer the size of a single data block may contain all zeroes and thus represent the bit for bit data contents of a zero data block. The buffer contents may be compared to the data block having the zero data block signature. If the data block matches the buffer contents, it may be determined that the data block is actually a zero data block. The data block may be the data contents of a particular LBA of a particular LUN and processing may be performed to accordingly set the flag field of the particular LBA of the particular LUN to denote that the LBA is a zero data block.

In this manner, LBAs which are zero data blocks may be treated as an unallocated data block with an implied data value or data contents.

Figure 9:
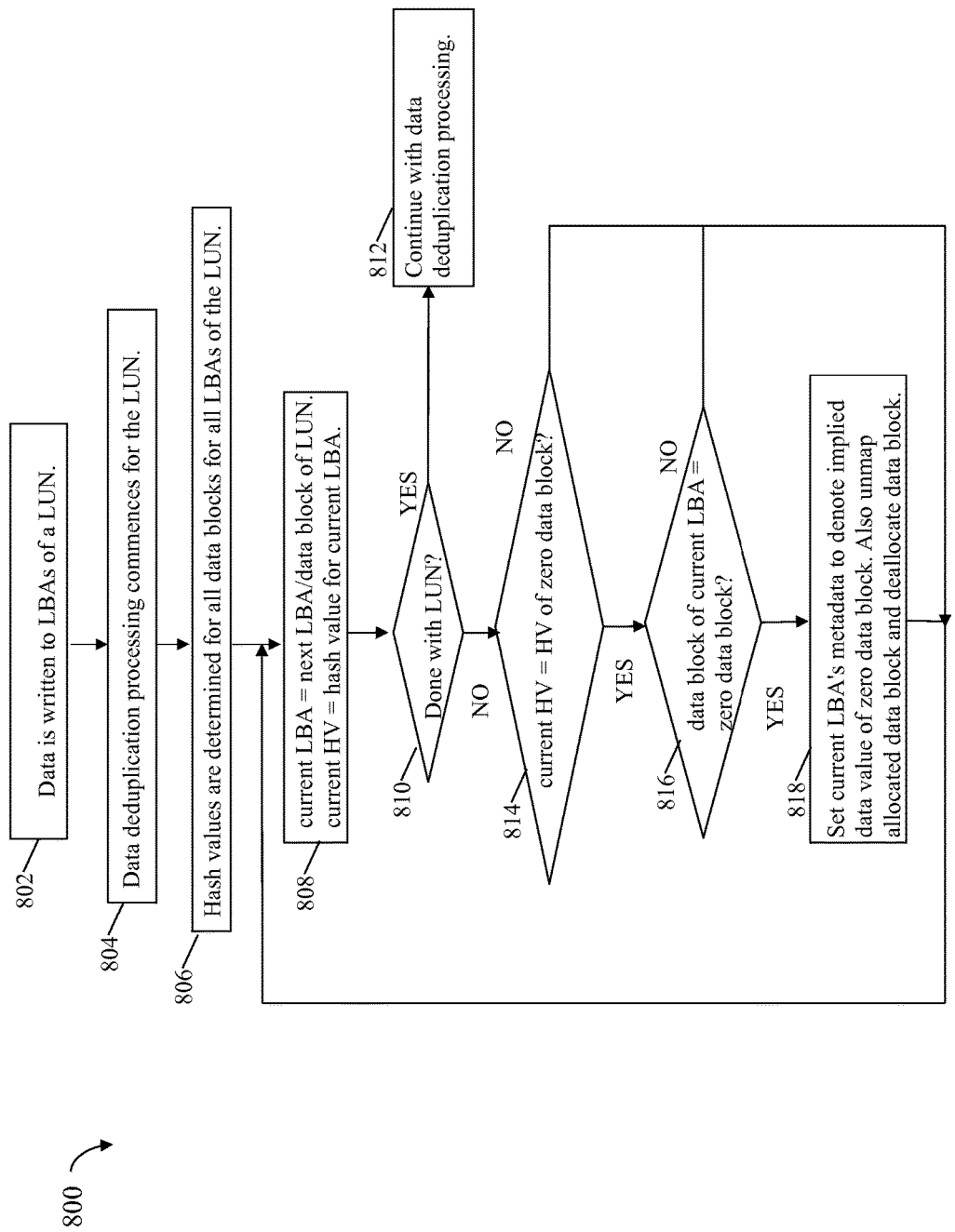
FIG. 9 is a flowchart of processing steps that may be performed in an embodiment in accordance with techniques herein.

Referring to FIG. 9, shown is a flowchart of processing steps that may be performed in an embodiment in accordance with techniques herein. The flowchart 800 summarizes processing steps described above. It should be noted that the flowchart 800 is described with reference to processing for a single LUN. However, as will be appreciated by those skilled in the art, such processing may be performed with respect to multiple LUNs.

At step 802, data is written to LBAs of a LUN, such as LUN X. At step 804, data deduplication processing may commence for the LUN. at step 806, hash values for all data blocks for all LBAs of the LUN X may be determined. At step 808, the variable current LBA is assigned the next LBA or data block of the LUN X and current HV is assigned the hash value for the data block of the current LBA. The foregoing variables initialized in step 808 are processing variables. At step 810, a determination is made as to whether processing is complete for the current LUN X. If step 810 evaluates to yes, control proceeds to step 812 to continue with data deduplication processing. Step 812 may include performing data deduplication with respect to any data blocks of the LUN X which are not zero data blocks. As described elsewhere herein, the zero data blocks are treated as unallocated data blocks and not associated with any allocated storage. No further data deduplication may be performed on the zero data blocks.

If step 810 evaluates to no, control proceeds to step 814 where a determination is made as to whether the current HV matches the hash value (HV) of the zero data block, such as may be stored in a buffer. If step 814 evaluates to no, control proceeds to step 808. If step 814 evaluates to yes, control proceeds to step 816 where a determination is made as to whether the data block of the current LBA matches the zero data block. If step 816 evaluates to no, control proceeds to step 808. If step 816 evaluates to yes, control proceeds to step 818. In step 818, the current LBA's metadata may be updated to denote that the current LBA has an implied data value that is the zero data block. Step 818 may also include unmapping the VBM structure and allocated data block from the current LBA (e.g., unlinking VBM 920 from the metadata of LBA N if LBA N is the current LBA). Step 818 may also include deallocating the data block linked to, or associated with, the current LBA (e.g., deallocating the data block 926 if the current LBA is N. Such deallocation may include deallocating the VBM 920). From step 818, control proceeds to step 808.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
  receiving, using a processor, a plurality of data portions of a logical device;
  determining, using a processor, a plurality of hash values for the plurality of data portions, each of the plurality of data portions having a corresponding one of the plurality of hash values;
  determining, using a processor, whether a first of the plurality of hash values associated with a first of the plurality of data portions is equal to a hash value of an implied data value; and
  if it is determined that the first hash value is equal to the hash value of the implied data value, performing, using a processor, first processing comprising:
    determining whether the first data portion has a current data value equal to the implied data value; and
    responsive to determining that the first data portion has a current data value equal to the implied data value, performing second processing including updating first metadata for the first data portion with an indicator to denote that the first data portion has said implied data value, wherein the implied data value is a particular data value implied by the indicator and the first data portion is not associated with any storage storing the particular data value implied by the indicator, wherein the indicator is a non-pointer field of the first metadata, wherein an operation to read the first data portion includes determining the particular data value implied by the indicator using only the indicator without accessing a stored value that is the particular data value, and wherein the method is performed as part of data deduplication processing, and wherein no data deduplication is performed for the first data portion and any other ones of the plurality of data portions equal to the implied data value.

2. The method of claim 1, wherein the implied data value is a zero data value.

3. The method of claim 1, wherein the plurality of data portions are logical data blocks of the logical device.

4. The method of claim 1, wherein data is written to the plurality of data portions.

5. The method of claim 1, wherein the first metadata includes a flag field as the indicator that is updated in said updating to denote that the first data portion has said implied data value.

6. The method of claim 1, wherein said second processing includes any of unmapping and deallocating a storage location associated with the first data portion where the storage location includes data content denoting the implied data value.

7. A system comprising:
  a processor; and
  a memory comprising code stored thereon that, when executed, performs a method of processing data comprising:
    receiving a plurality of data portions of a logical device;
    determining a plurality of hash values for the plurality of data portions, each of the plurality of data portions having a corresponding one of the plurality of hash values;

determining whether a first of the plurality of hash values associated with a first of the plurality of data portions is equal to a hash value of an implied data value; and if it is determined that the first hash value is equal to the hash value of the implied data value, performing first processing comprising:

determining whether the first data portion has a current data value equal to the implied data value; and responsive to determining that the first data portion has a current data value equal to the implied data value, performing second processing including updating first metadata for the first data portion with an indicator to denote that the first data portion has said implied data value, wherein the implied data value is a particular data value implied by the indicator and the first data portion is not associated with any storage storing the particular data value implied by the indicator, wherein the indicator is a non-pointer field of the first metadata, wherein an operation to read the first data portion includes determining the particular data value implied by the indicator using only the indicator without accessing a stored value that is the particular data value, and wherein the method is performed as part of data deduplication processing, and wherein no data deduplication is performed for the first data portion and any other ones of the plurality of data portions equal to the implied data value.

8. A non-transitory computer readable medium comprising code stored thereon that, when executed, performs a method of processing data comprising:

receiving a plurality of data portions of a logical device;

determining a plurality of hash values for the plurality of data portions, each of the plurality of data portions having a corresponding one of the plurality of hash values;

determining whether a first of the plurality of hash values associated with a first of the plurality of data portions is equal to a hash value of an implied data value; and if it is determined that the first hash value is equal to the hash value of the implied data value, performing first processing comprising:

determining whether the first data portion has a current data value equal to the implied data value; and responsive to determining that the first data portion has a current data value equal to the implied data value, performing second processing including updating first metadata for the first data portion with an indicator to denote that the first data portion has said implied data value, wherein the implied data value is a particular data value implied by the indicator and the first data portion is not associated with any storage storing the particular data value implied by the indicator, wherein the indicator is a non-pointer field of the first metadata, wherein an operation to read the first data portion includes determining the particular data value implied by the indicator using only the indicator without accessing a stored value that is the particular data value, and wherein the method is performed as part of data deduplication processing, and wherein no data deduplication is performed for the first data portion and any other ones of the plurality of data portions equal to the implied data value.

9. The non-transitory computer readable medium of claim 8, wherein the implied data value is a zero data value.

10. The non-transitory computer readable medium of claim 8, wherein the plurality of data portions are logical data blocks of the logical device.

11. The non-transitory computer readable medium of claim 8, wherein data is written to the plurality of data portions.

12. The non-transitory computer readable medium of claim 8, wherein the first metadata includes a flag field as the indicator that is updated in said updating to denote that the first data portion has said implied data value.

13. The non-transitory computer readable medium of claim 8, wherein said second processing includes any of unmapping and deallocating a storage location associated with the first data portion where the storage location includes data content denoting the implied data value.

* * * * *